United States Patent [19]

Wang

[11] Patent Number: 5,111,183
[45] Date of Patent: May 5, 1992

[54] THIRD BRAKE LAMP EMPLOYING OPTICAL FIBERS

[76] Inventor: Frank Wang, No. 296, Section 2, Lu Shun Road, Pei Tun District, Tai Chung City, Taiwan

[21] Appl. No.: 676,426
[22] Filed: Mar. 28, 1991
[51] Int. Cl.⁵ .............................................. G60Q 1/44
[52] U.S. Cl. ............................... 340/479; 340/815.31; 40/547
[58] Field of Search ............... 340/479, 468, 482, 472, 340/471, 815.31; 40/547

[56] References Cited

U.S. PATENT DOCUMENTS

| | | | |
|---|---|---|---|
| 3,562,746 | 2/1971 | Aron | 340/815.31 |
| 3,962,702 | 6/1976 | Kriege | 340/815.31 |
| 4,935,722 | 6/1990 | Pollack | 340/479 |
| 5,010,319 | 4/1991 | Killinger | 340/815.31 X |

FOREIGN PATENT DOCUMENTS

| | | | |
|---|---|---|---|
| 784432 | 5/1968 | Canada | 40/547 |
| 1499121 | 1/1978 | United Kingdom | 40/547 |

Primary Examiner—Jin F. Ng
Assistant Examiner—Brian R. Tumm
Attorney, Agent, or Firm—Morton J. Rosenberg; David I. Klein

[57] ABSTRACT

A third brake lamp employing optical fibers, in which when braking, a lamp emits light which goes through a color board rotarily driven by a motor, the light being focused on a grouped end of the optical fibers and conducted to the other end of the optical fibers to form a warning picture or characters with multiple colors.

2 Claims, 5 Drawing Sheets

THIRD BRAKE LAMP EMPLOYING OPTICAL FIBERS

BACKGROUND OF THE INVENTION

The currently used third brake lamp of a vehicle employs a bulb which emits light onto a color shade to produce warning effect. In case the light is desired to compose a warning picture or character, then the projecting area of the light must be limited. Such application is complicated and difficult to be varied.

SUMMARY OF THE INVENTION

It is therefore a primary object of this invention to provide a third brake lamp employing optical fibers in which a lamp emits light onto a grouped end of optical fibers. The light is then conducted to a scattered end of the optical fibers. The scattered end of the optical fibers is respectively inserted into a hole array of a display panel in a specific pattern whereby a warning picture or character is formed by a number of light points.

It is a further object of this invention to provide the above third brake lamp wherein a rotarily driven multicolored board is provided so that the color of warning picture or character can be varied.

DETAILED DESCRIPTION OF THE PREFERRED EMBODIMENT

Figure 1:
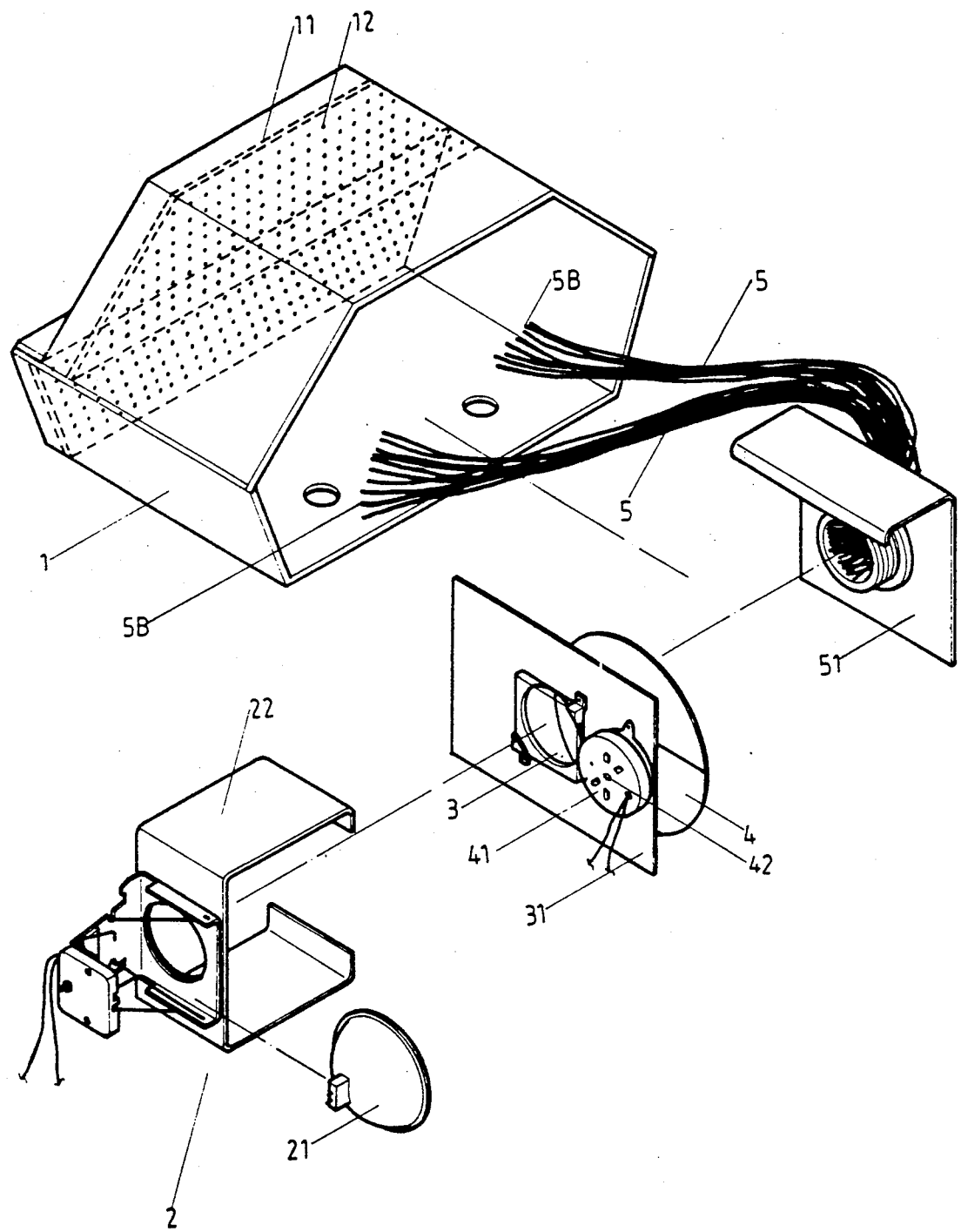
FIG. 1 is an exploded view of this invention.
Figure 2:
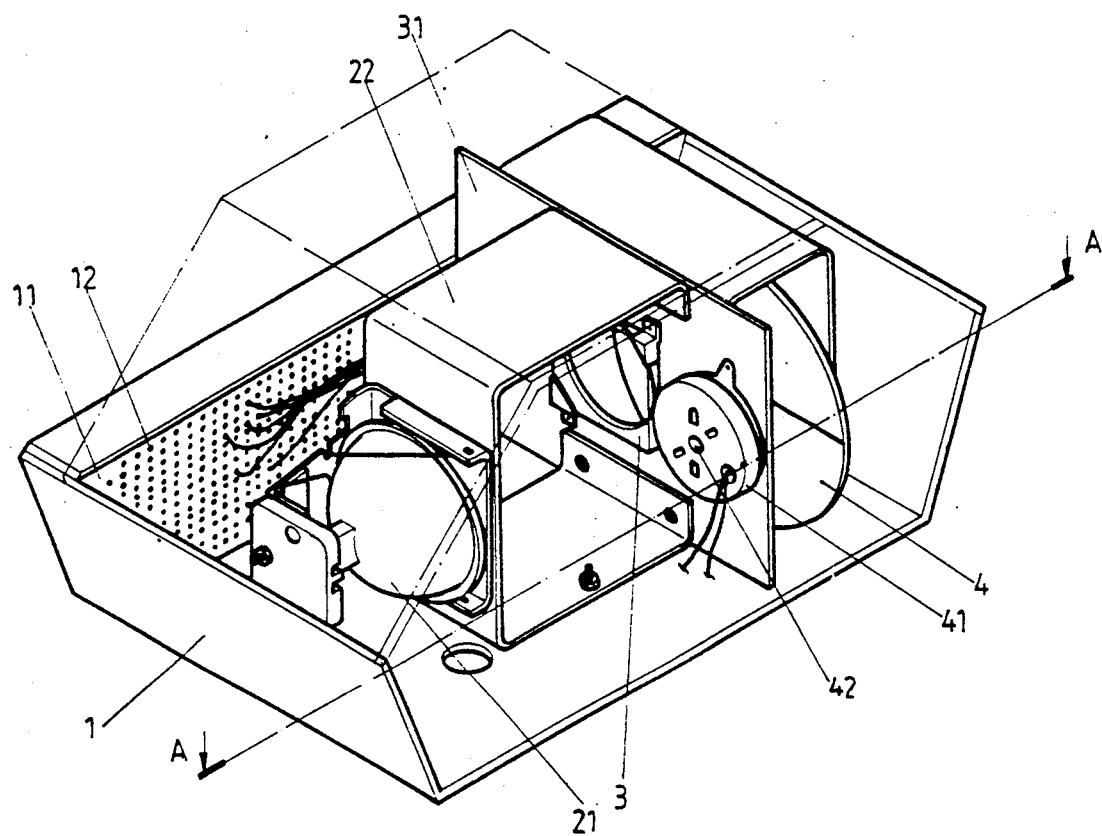
FIG. 2 is an assembled view of this invention.

Please first refer to FIG. 1 and 2. The present invention includes a housing 1, a light source assembly 2 received in the housing 1, a focusing lens 3, a rotatable color board 4 and optical fibers 5, wherein the light source assembly 2 includes a halogen lamp 21 mounted on a lamp support 22 which is secured in the housing 1.

The focusing lens 3 and color board 4 are mounted on a bracket 31 which is secured in the housing 1. The focusing lens 3 is disposed in alignment with the halogen lamp 21 and a motor 41 is disposed beside the focusing lens 3. A central shaft 42 of the motor 41 goes through the bracket 31 to connect with the color board 4. The color board 4 can thoroughly cover the focusing lens 3. The color board 4 can be formed with a single color or multiple spaced apart colors.

The optical fibers 5 can be made from plastic or quartz. Each optical fiber 5 has a first end 5A of which is grouped and secured to a bracket 51 a second end 5B end of which is scattered and respectively fitted into hole array 12 of a display panel 11 of the housing 1.

Figure 3:
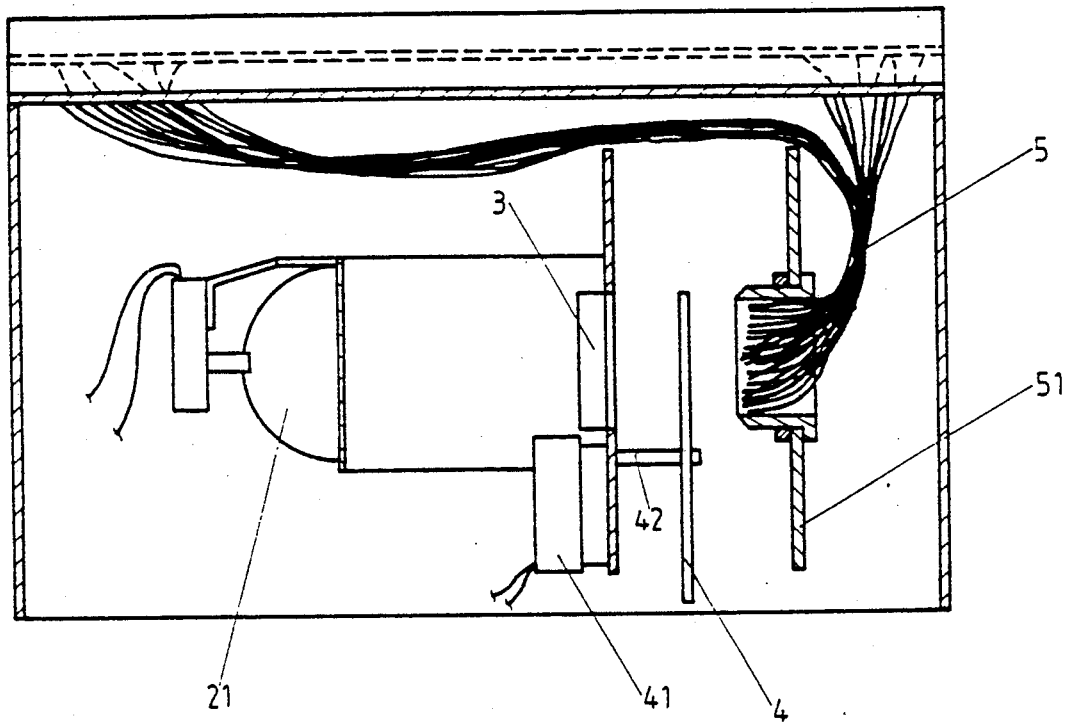
FIG. 3 is a sectional view taken on line A—A of FIG. 2.
Figure 4:
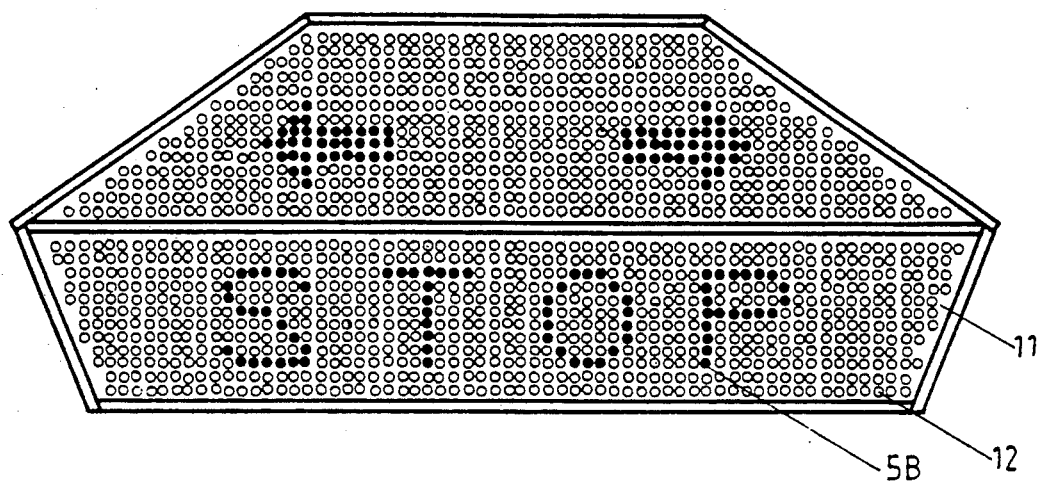
FIG. 4 is an embodiment of the pattern of the optical fiber arrangement.
Figure 5:
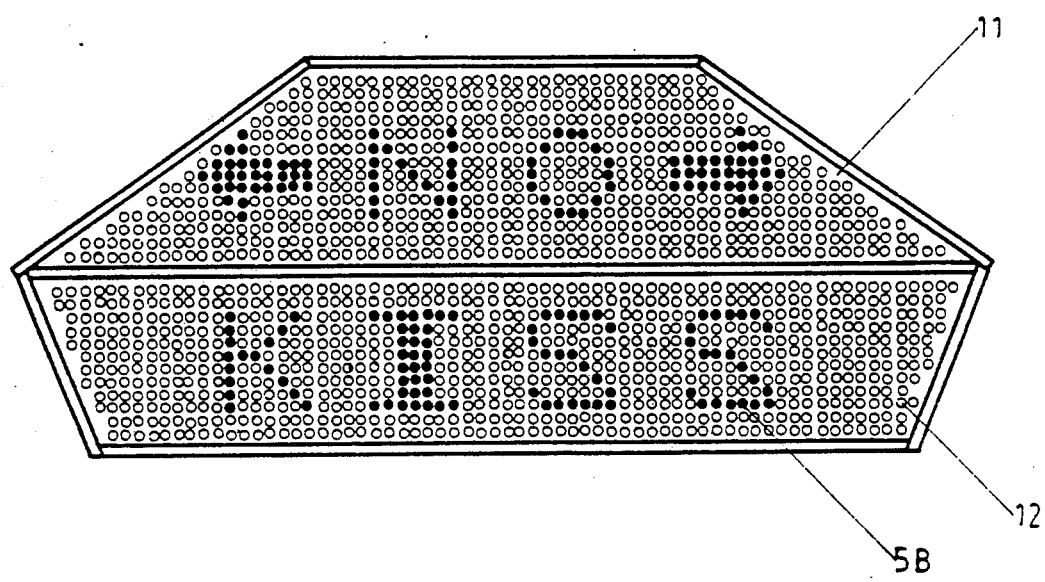
FIG. 5 is another embodiment of the pattern of the optical fiber arrangement.

Referring to FIGS. 2 and 3, the halogen lamp 21 emits light which passes through the focusing lens 3 and color board 4 to be focused on the first ends 5A of the optical fibers 5. The optical fibers 5 then conduct the light to the display panel 11, forming a warning picture or several characters consist of a number of light points.

According to the above arrangement, the halogen lamp 21 can be electrically connected with a brake lamp or a distress lamp to produce warning effect. In case the motor 41 is additionally electrically connected with the brake lamp or distress lamp, then when a brake pedal is stepped down or the distress lamp is turned on, the motor 41 will rotarily drive the color board 4 so that several kinds of lights with a variety of colors can be created to form a colorful picture or character.

It should be noted that the warning picture or characters are formed by means of inserting the second ends 5B of optical fibers 5 into the hole array 12 of the display panel 11. As a result, the insertion position of the second ends 5B of optical fibers 5 can be changed to vary the warning picture or characters.

I claim:

1. A third brake lamp comprising:
   (a) a housing;
   (b) a light source assembly received in said housing, said light source assembly including a lamp support having a lamp means mounted thereto;
   (c) first bracket means mounted in said housing adjacent said light source assembly, said first bracket means having a first aperture therethrough, a focusing lens mounted in said first aperture, drive means mounted to a first surface of said first bracket means, said drive means having a shaft passing through said first bracket means, and a color board rotatably mounted on said shaft of said drive means adjacent a second surface of said first bracket means to cover said focusing lens;
   (d) second bracket means mounted in said housing adjacent said first bracket, said second bracket means having a second aperture passing therethrough; and,
   (e) a plurality of optical fibers, each having a first end mounted in said second aperture of said second bracket means and a second end removably mounted in an opening array of a display panel mounted in a first end of said housing, wherein said light emitted from said lamp means passes through said focusing lens and said color board to be focused on said first end of each of said optical fibers.

2. A third brake lamp assembly as recited in claim 1 wherein said color board is multi-colored.

* * * * *